United States Patent Office.

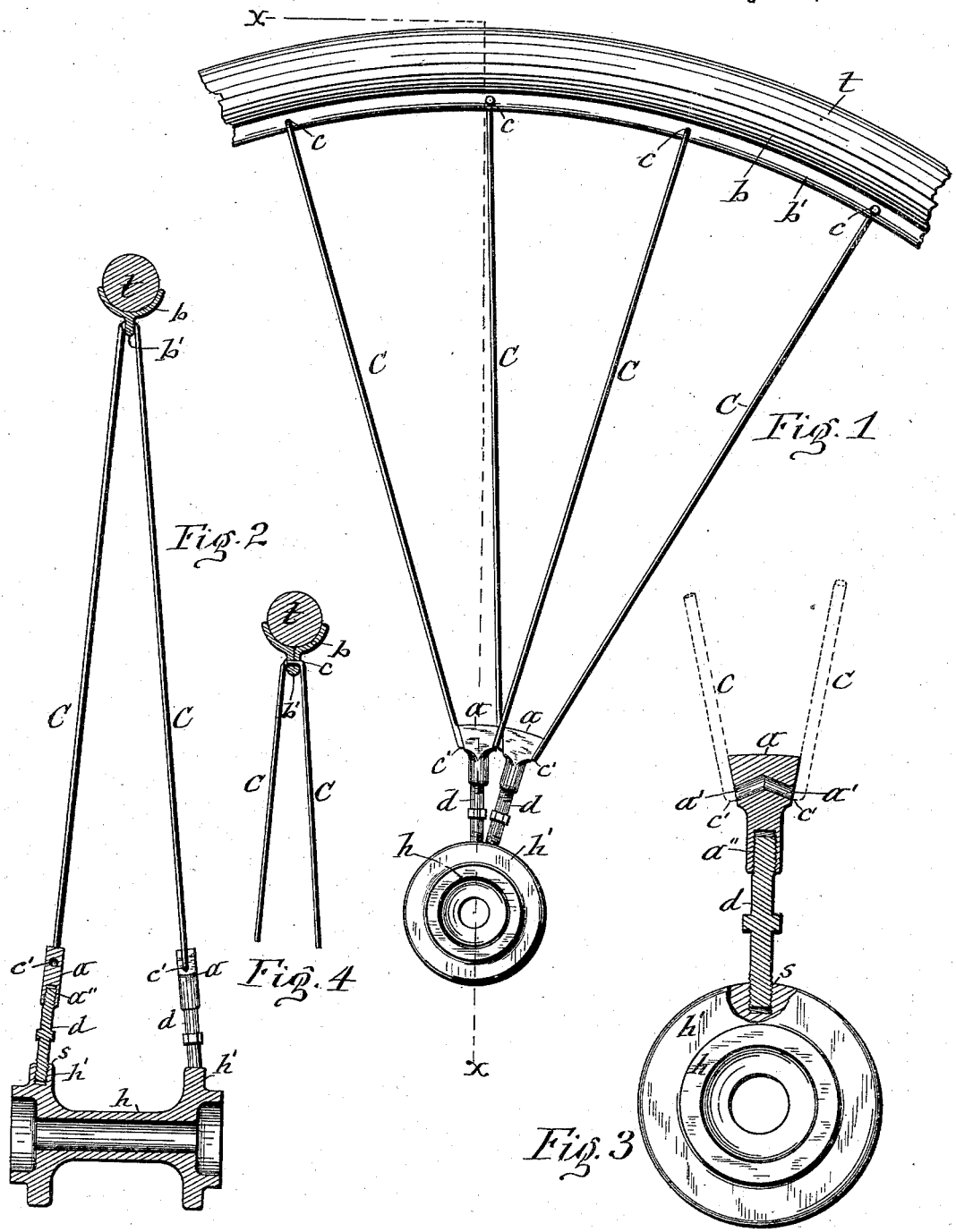

CHARLES O. BARNES AND LUCIEN BARNES, SR., OF SYRACUSE, NEW YORK.

BICYCLE-WHEEL.

SPECIFICATION forming part of Letters Patent No. 474,897, dated May 17, 1892.

Application filed January 25, 1892. Serial No. 419,108. (No model.)

*To all whom it may concern:*

Be it known that we, CHARLES O. BARNES and LUCIEN BARNES, Sr., of Syracuse, in the county of Onondaga, in the State of New York, have invented new and useful Improvements in Bicycle-Wheels, of which the following, taken in connection with the accompanying drawings, is a full, clear, and exact description.

This invention consists, first, in improved means for adjustably connecting the spokes to the hub, so as to impart the requisite tension to the spokes, and, secondly, in a novel construction of the felly or rim and the connection of the spokes to said rim, whereby the perforation and consequent weakening of said rim is obviated and the same is additionally reinforced, all as hereinafter fully described, and set forth in the claims.

In the annexed drawings, Figure 1 is a side view of a portion of a bicycle-wheel embodying our invention. Fig. 2 is a transverse section on line $x$ $x$ in Fig. 1. Fig. 3 is an enlarged detail view of the connection of the spokes to the hub, and Fig. 4 is a transverse section of a modification of the construction of the felly.

Similar letters of reference indicate corresponding parts.

$h$ represents the hub of the wheel, which hub is formed with two annular webs or flanges $h'$ $h'$, each of which is provided with a series of screw-threaded radial sockets $s$, distributed around the same.

$b$ denotes the felly or rim, to which the elastic tire $t$ is attached. In order to obviate perforating and thus weakening said rim and to additionally reinforce the same, we form said rim with the continuous circumferential rib $b'$ on the center of its inner side. On large wheels we prefer to strengthen said rib by forming the felly of a metal band folded double along the longitudinal central portion thereof, as represented in Fig. 4 of the drawings.

The rib $b'$ is perforated transversely at intervals of its length, and receives through it the hooks $c$ $c$, formed on the outer ends of the spokes C C. The ends of said hooks are upset or headed to retain the spokes connected to the rib $b'$. The inner ends of the spokes also terminate with hooks $c'$ $c'$, which extend from the adjacent sides of each pair of spokes, and onto these hooks of said pair of spokes and toward each other is hung a metal block $a$, which is provided in two opposite sides with inclined sockets $a'$ $a'$, into which the hooks $c'$ $c'$ are inserted. The end of the block $a$ adjacent to the hub is provided with a radial socket $a''$, which has screw-threads reverse from those of the sockets in the hub. Each pair of spokes is tied to the hub by means of a right-and-left screw $d$, inserted into the sockets $a''$ and $s$. By turning the said screw so as to cause it to enter deeper into the sockets, the spokes are drawn toward the hub, and thus said spokes become tightened. In this manner the tension of all the spokes can be readily adjusted. By turning the screw in the opposite direction the spokes can be slackened sufficiently to allow the hooks $c'$ $c'$ to be withdrawn from the sockets $a'$ $a'$, and thus the spokes are readily detached from the hub.

Having described our invention, what we claim as new, and desire to secure by Letters Patent, is—

1. A bicycle-wheel comprising a felly formed with a concave seat for the tire and with a perforated circumferential rib in the center of its inner side, wire spokes secured in the perforations of said rib and terminating with hooks on their inner ends, blocks hung on said hook, and screws connecting said blocks to the hub of the wheel, substantially as set forth and shown.

2. In combination with two wire spokes tied to the felly and terminating with hooks extending from their adjacent sides, a metal block formed with inclined sockets in two opposite sides and holding therein the hook ends of the spokes, and a screw connecting said block to the hub, as set forth.

In testimony whereof we have hereunto signed our names this 18th day of January, 1892.

CHARLES O. BARNES. [L. S.]
LUCIEN BARNES, SR. [L. S.]

Witnesses:
MARK W. DEWEY,
H. M. SEAMANS.